(12) United States Patent
Tachibana et al.

(10) Patent No.: US 10,151,266 B2
(45) Date of Patent: *Dec. 11, 2018

(54) CONTROL SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Rintarou Tachibana, Toyota (JP); Tooru Suda, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/409,365

(22) Filed: Jan. 18, 2017

(65) Prior Publication Data
US 2017/0211502 A1  Jul. 27, 2017

(30) Foreign Application Priority Data
Jan. 27, 2016  (JP) .................................. 2016-013824

(51) Int. Cl.
*F02D 41/32* (2006.01)
*F02D 41/34* (2006.01)
(Continued)

(52) U.S. Cl.
CPC ......... *F02D 41/32* (2013.01); *F02D 41/1401* (2013.01); *F02D 41/3094* (2013.01);
(Continued)

(58) Field of Classification Search
CPC ...... F02D 41/32; F02D 41/3094; F02D 41/34; F02D 41/3854; F02D 2041/1412;
(Continued)

(56) References Cited

U.S. PATENT DOCUMENTS 6,810,855 B2    11/2004  Hasegawa et al.
9,938,923 B2 *  4/2018   Tachibana ........... F02D 41/3094
(Continued)

FOREIGN PATENT DOCUMENTS

DE     103 02 806 A1    8/2004
DE   102007000063 A1    8/2007
(Continued)

OTHER PUBLICATIONS

International Patent Application No. PCT/JP2016/080726 filed Oct. 17, 2016.

(Continued)

*Primary Examiner* — Mahmoud Gimie
(74) *Attorney, Agent, or Firm* — Oliff PLC

(57) ABSTRACT

A control system of an internal combustion engine includes an electronic control unit. The electronic control unit is configured to: (i) obtain a detection value of a fuel pressure sensor at fixed sampling time intervals; (ii) calculate a center fuel pressure value of a pulsation of the fuel pressure, based on at least a first latest fuel pressure value and a second latest fuel pressure value as detection values of the fuel pressure sensor, (iii) calculate an amplitude of the pulsation of the fuel pressure, based on at least the second latest fuel pressure value and the first latest fuel pressure value; (iv) calculate an initial phase of the pulsation of the fuel pressure, based on at least one of the second latest fuel pressure value and the first latest fuel pressure value, and (v) predict a fuel pressure value corresponding to the crank angle, based on a predetermined formula.

10 Claims, 12 Drawing Sheets

(51) Int. Cl.
*F02D 41/30* (2006.01)
*F02D 41/14* (2006.01)
*F02D 41/38* (2006.01)
*F02M 63/02* (2006.01)

(52) U.S. Cl.
CPC ......... *F02D 41/34* (2013.01); *F02D 41/3854* (2013.01); *F02D 2041/1412* (2013.01); *F02D 2041/389* (2013.01); *F02D 2041/3881* (2013.01); *F02D 2200/0602* (2013.01); *F02D 2200/0604* (2013.01); *F02D 2200/101* (2013.01); *F02D 2250/04* (2013.01); *F02M 63/0225* (2013.01); *Y02T 10/44* (2013.01)

(58) Field of Classification Search
CPC ..... F02D 2041/3881; F02D 2200/0602; F02D 2200/0604
See application file for complete search history.

(56) References Cited

U.S. PATENT DOCUMENTS

| | | | |
|---|---|---|---|
| 2005/0098155 | A1 | 5/2005 | Yamazaki et al. |
| 2005/0193982 | A1* | 9/2005 | Sakai .................. F02D 41/3094 123/431 |
| 2017/0211501 | A1 | 7/2017 | Tachibana et al. |
| 2017/0211503 | A1 | 7/2017 | Tachibana et al. |

FOREIGN PATENT DOCUMENTS

| | | |
|---|---|---|
| DE | 10 2006 042098 B3 | 5/2008 |
| DE | 10 2008 002216 A1 | 10/2009 |
| JP | H07-208236 A | 8/1995 |
| JP | 2005-146882 A | 6/2005 |
| JP | 2012-237274 A | 12/2012 |
| JP | 2014-190186 A | 10/2014 |
| JP | 2017-133420 A | 8/2017 |

OTHER PUBLICATIONS

Baumann, "Einspritzmengenkorrektur in Common-Rail-Systemen mit Hilfe magnetoelastischer Drucksensoren," Universitätsverlag Karlsruhe, pp. 1-11 and 123-130, 2006.

Jun. 27, 2017 Extended Search Report issued in European Patent Application No. 17152762.5.

U.S. Appl. No. 15/408,928, filed Jan. 18, 2017 in the name of Tachibana et al.

Jan. 18, 2018 Notice of Allowance issued in U.S. Appl. No. 15/408,928.

Feb. 13, 2018 Corrected Notice of Allowance issued in U.S. Appl. No. 15/408,928.

U.S. Appl. No. 15/409,390, filed Jan. 18, 2017 in the name of Tachibana et al.

\* cited by examiner

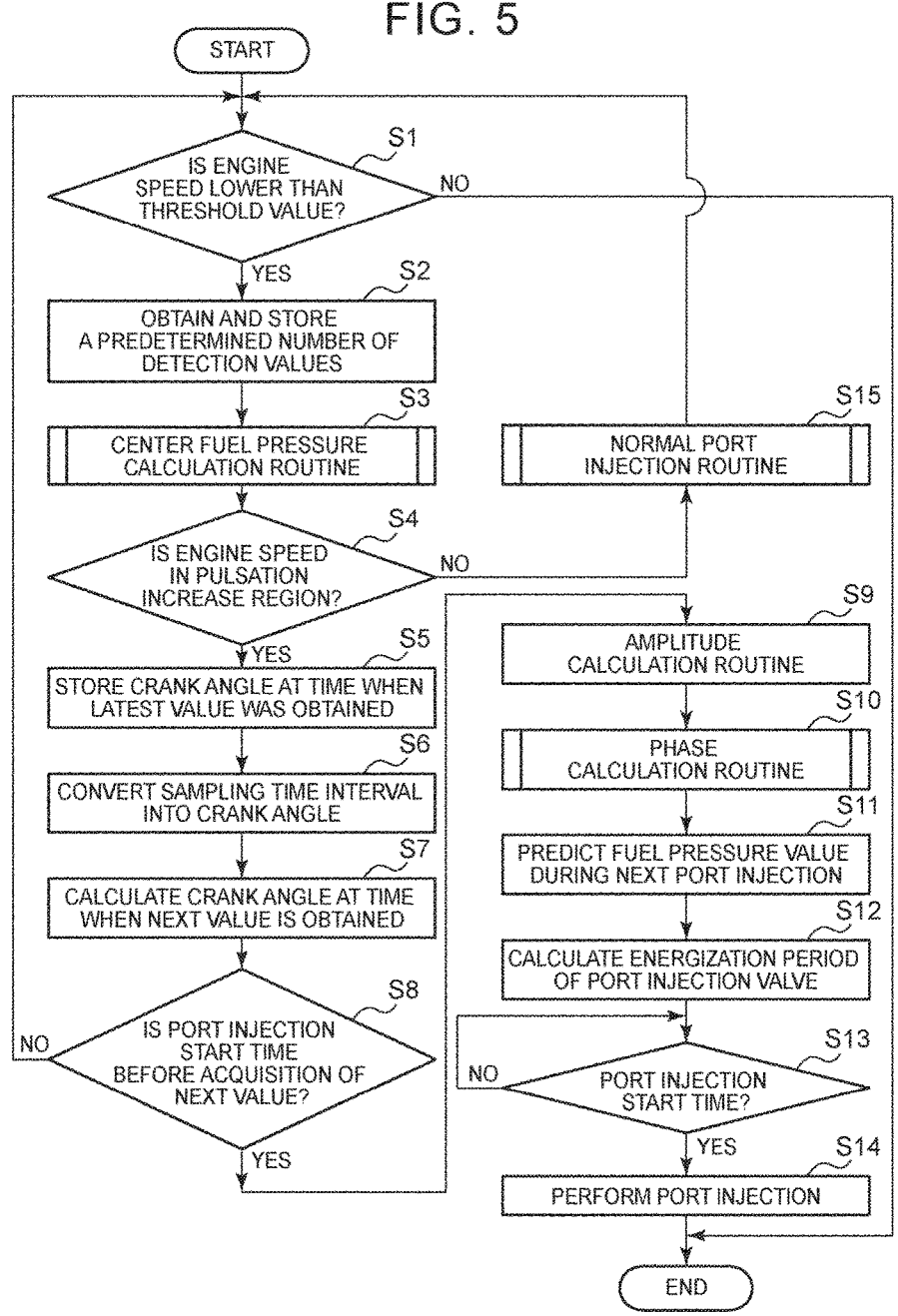

CONTROL SYSTEM OF INTERNAL COMBUSTION ENGINE

INCORPORATION BY REFERENCE

The disclosure of Japanese Patent Application No. 2016-013824 filed on Jan. 27, 2016 including the specification, drawings and abstract is incorporated herein by reference in its entirety.

BACKGROUND

1. Technical Field

The present disclosure relates to a control system of an internal combustion engine.

2. Description of Related Art

An internal combustion engine including direct injection valves and port injection valves is known. In the internal combustion engine, fuel pumped up by a low-pressure pump is supplied to the port injection valves via a low-pressure fuel passage, and the fuel further pressurized by a high-pressure pump is supplied to the direct injection valves via a high-pressure fuel passage. In this arrangement, a fuel sensor that detects the fuel pressure in the low-pressure fuel passage may be provided. Detection values of the fuel pressure sensor may be used for control of various controlled objects, such as the amounts of fuel injected from the port injection valves.

In the above-described arrangement, pulsation of the fuel pressure may occur in the low-pressure fuel passage, mainly due to driving of the high-pressure pump. If the fuel injection amounts of the port injection valves are controlled based on detection values of the fuel pressure sensor during occurrence of the pulsation, the fuel injection amounts may not be appropriately controlled, for the reason as follows. A certain period is required from the time when a detection value of the fuel pressure sensor is obtained, to the time when port injection is started based on the detection value. Therefore, if the pulsation is generated, the fuel pressure may vary largely during a period from the time when the detection value is obtained, to the time when port injection is started, and the obtained detection value and the actual fuel pressure value during port injection may be largely different from each other.

Thus, according to a technology described in Japanese Patent Application Publication No. 2012-237274 (JP 2012-237274 A), during occurrence of pulsation, the fuel injection amounts of the port injection valves are controlled, based on a map in which a correction value of the port injection amount is specified in advance for each rotational speed of the internal combustion engine, without using the actual fuel pressure values.

SUMMARY

However, the actual fuel pressure values are considered to be influenced by factors other than the rotational speed of the internal combustion engine, more specifically, the load and temperature of the engine, or characteristics of the fuel used, for example. Therefore, even if the fuel injection amount as a controlled object is controlled based on the above-described map, the fuel injection amount may not be appropriately controlled. Also, it is difficult to create a map in which the fuel injection amount is associated with each of a plurality of factors including the rotational speed of the engine and other factors.

Accordingly, even during occurrence of pulsation, it is still desirable to control the controlled object based on detection values of the fuel pressure sensor which reflect the actual fuel pressure values. However, the controlled object may not be appropriately controlled, since the detection values of the fuel pressure sensor may be largely different from the fuel pressure values obtained during control of the controlled object, as described above.

The present disclosure provides a control system of an internal combustion engine, which can predict a fuel pressure value with high accuracy, based on a detection value of a fuel pressure sensor which reflects the actual fuel pressure value.

A control system of an internal combustion engine according to one aspect of the present disclosure includes a direct injection valve, a port injection valve, a low-pressure pump, a low-pressure fuel supply passage, a high-pressure pump, a high-pressure fuel supply passage, a crank angle sensor, a fuel pressure sensor, and an electronic control unit. The direct injection valve is configured to directly inject a fuel into a cylinder of the internal combustion engine. The port injection valve is configured to inject the fuel into an intake port of the internal combustion engine. The low-pressure pump is configured to pressurize the fuel. The fuel pressurized by the low-pressure pump is supplied to the port injection valve, through the low-pressure fuel supply passage. The high-pressure pump is operatively linked with the internal combustion engine and configured to be driven by the internal combustion engine. The high-pressure pump is configured to further pressurize the fuel supplied from the low-pressure fuel supply passage, such that pulsation of a fuel pressure is generated in the low-pressure fuel supply passage. The fuel pressurized by the high-pressure pump is supplied to the direct injection valve, through the high-pressure fuel supply passage. The crank angle sensor is configured to detect a crank angle of the internal combustion engine. The fuel pressure sensor is configured to detect the fuel pressure in the low-pressure fuel supply passage. The electronic control unit is configured to: (i) obtain a detection value of the fuel pressure sensor at fixed sampling time intervals, (ii) calculate a center fuel pressure value of the pulsation of the fuel pressure, based on at least a first latest fuel pressure value and a second latest fuel pressure value as detection values of the fuel pressure sensor, the first latest fuel pressure value being obtained most recently, the second latest fuel pressure value being obtained immediately before the first latest fuel pressure value is obtained, (iii) calculate an amplitude of the pulsation of the fuel pressure, based on at least the second latest fuel pressure value and the first latest fuel pressure value, (iv) calculate an initial phase of the pulsation of the fuel pressure, based on at least one of the second latest fuel pressure value and the first latest fuel pressure value, and (v) predict a fuel pressure value corresponding to the crank angle, based on a formula (1) as follows:

$$P(\theta) = A\cos\{c(\theta - B)\} + P_c \quad (1)$$

where P is a fuel pressure value corresponding to the crank angle, $\theta$ is the crank angle, c is a number of times of discharge of the fuel from the high-pressure pump per 360 degrees of the crank angle, $P_c$ is the center fuel pressure value, A is the amplitude, and B is the initial phase.

A value of each term of the above-indicated formula (1) is calculated based on detection values of the fuel pressure sensor which reflect the actual fuel pressure values. Therefore, each term of the above formula (1) can be calculated with high accuracy, and, consequently, the fuel pressure value can be predicted with high accuracy, based on the above-indicated formula (1).

In the control system of the internal combustion engine according to the above aspect, the electronic control unit may be configured to calculate the amplitude, based on the second latest fuel pressure value and the first latest fuel pressure value, and the crank angle corresponding to the sampling time interval.

In the control system of the internal combustion engine as described above, the electronic control unit may be configured to calculate the initial phase, based on the above-indicated one of the second latest fuel pressure value and the first latest fuel pressure value, the crank angle at a time when the above-indicated one of the second latest fuel pressure value and the first latest fuel pressure value is obtained, the number of times of discharge, the amplitude, and the center fuel pressure value.

In the control system of the internal combustion engine according to the above aspect, wherein the electronic control unit may calculate the center fuel pressure value, based on a third latest fuel pressure value, the second latest fuel pressure value, the first latest fuel pressure value, and the crank angle corresponding to the sampling time interval. The third latest fuel pressure value is a detection value of the fuel pressure sensor obtained immediately before the second latest fuel pressure value is obtained.

In the control system of the internal combustion engine according to the above aspect, the electronic control unit may be configured to calculate a smoothed value obtained through a smoothing operation based on the second latest fuel pressure value and the first latest fuel pressure value, as the center fuel pressure value.

In the control system of the internal combustion engine as described above, the electronic control unit may be configured to set a smoothing coefficient for use in the smoothing operation to a smaller value as a difference between a target value of the fuel pressure in the low-pressure fuel supply passage and the calculated center fuel pressure value is larger, as compared with the case where the difference is smaller.

In the control system of the internal combustion engine according to the above aspect, the electronic control unit may be configured to calculate an average value of a plurality of the detection values including the second latest fuel pressure value and the first latest fuel pressure value, as the center fuel pressure value, and the electronic control unit may be configured to calculate an average value of a smaller number of the detection values as the center fuel pressure value as a rotational speed of the internal combustion engine is higher, as compared with the case where the rotational speed is lower.

In the control system of the internal combustion engine according to the above aspect, the electronic control unit may be configured to predict the fuel pressure value corresponding to the crank angle, based on a formula (2) below, in view of a phase delay from a time when the fuel pressure sensor generates an output signal corresponding to the detection value to a time when the electronic control unit obtains the detection value:

$$P(\theta) = A\cos\{c(\theta - B - \tau)\} + P_c \quad (2)$$

where τ is the phase delay.

In the control system of the internal combustion engine according to the above aspect, the electronic control unit may be configured to determine whether a rotational speed of the internal combustion engine calculated based on an output of the crank angle sensor belongs to a pulsation increase region in which the pulsation is larger than that in the other rotational speed region of the internal combustion engine, and the electronic control unit may be configured to predict the fuel pressure value, when the electronic control unit determines that the rotational speed of the internal combustion engine belongs to the pulsation increase region.

In the control system of the internal combustion engine according to the above aspect, the electronic control unit may be configured to control a fuel injection amount of the port injection valve, based on the predicted fuel pressure value. The electronic control unit may be configured to determine whether a start time of fuel injection of the port injection valve is after the first latest fuel pressure value is obtained, and before a next detection value of the fuel pressure is obtained. The electronic control unit may be configured to predict the fuel pressure value, when the start time of fuel injection of the port injection valve is after the first latest fuel pressure value is obtained, and before the next detection value of the fuel pressure is obtained.

According to the above aspect of the present disclosure, the control system of the internal combustion engine which can predict a fuel pressure value based on the detection values of the fuel pressure sensor which reflect the actual fuel pressure values can be provided.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a flowchart illustrating one example of port injection control;

DETAILED DESCRIPTION OF EMBODIMENTS

A preferred embodiment of the present disclosure will be described with reference to the drawings.

Figure 1:
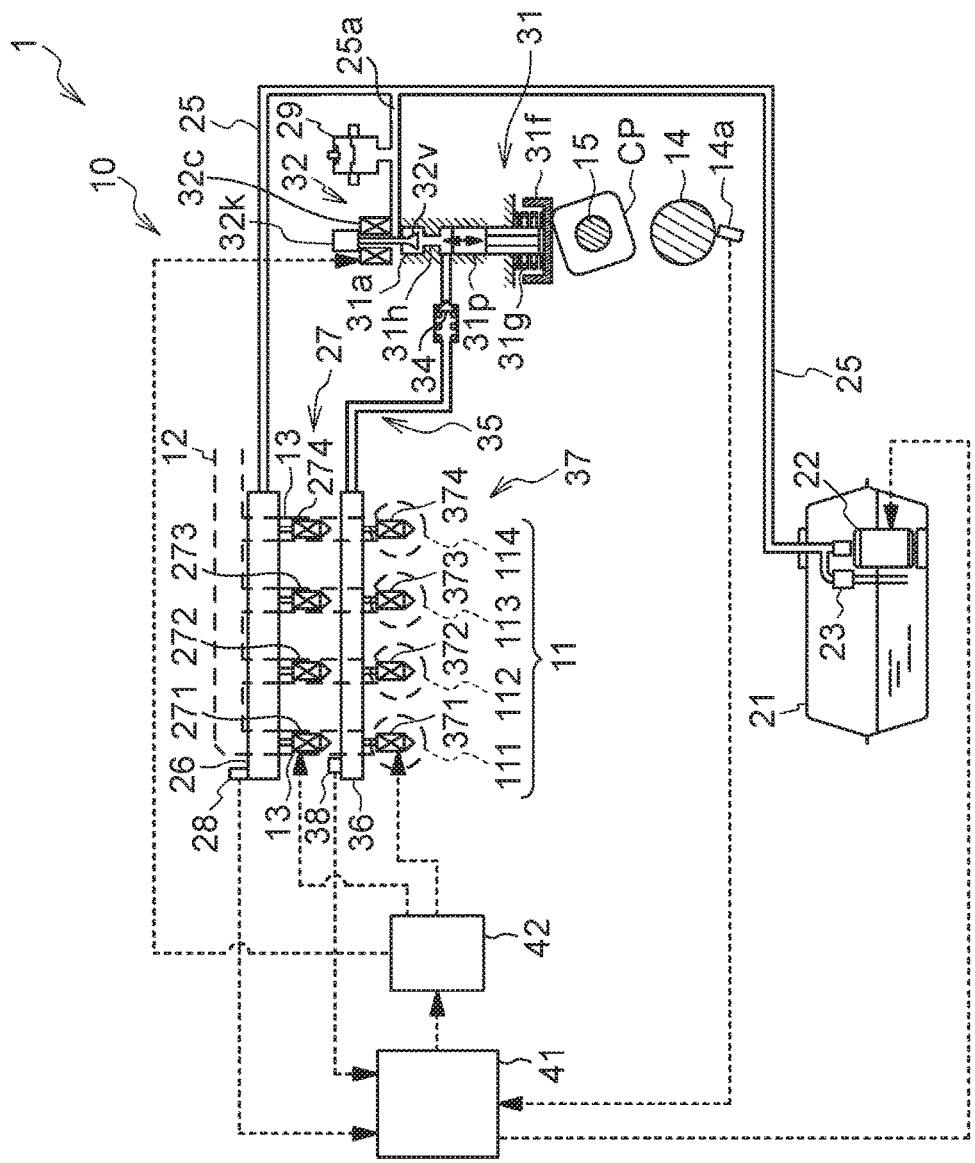
FIG. 1 is a schematic view showing the configuration of an engine system as one embodiment of the present disclosure.

FIG. 1 schematically shows the configuration of an engine system (which will be referred to as "system") 1 of this embodiment. The system 1 includes an engine 10, and an ECU (Electronic Control Unit) 41 that controls the engine 10. The engine 10 is a spark-ignition type in-line four-cylinder engine having a group of cylinders 11 including cylinders 111-114 that are arranged in series, a group of direct injection valves 37, and a group of port injection valves 27. The engine 10 is one example of the internal combustion engine, and the engine system 1 is one example of the control system of the internal combustion engine.

The group of direct injection valves 37 includes direct injection valves 371-374 that inject fuel into the cylinders 111-114, respectively. The group of port injection valves 27 includes port injection valves 271-274 that inject fuel into intake ports 13 that communicate with the cylinders 111-114, respectively. Each of the direct injection valves 371-374 and the port injection valves 271-274 is an electromagnetically driven shutoff valve or solenoid valve having an electromagnetic coil, a valve seat and a valve body. In operation, the electromagnetic coil is energized for a given energization period, so that the valve body is moved away from the valve seat, thereby to adjust the fuel injection amount.

The engine 10 is formed with an intake passage 12 having a plurality of intake ports 13 corresponding to the cylinders 111-114, respectively, and an exhaust passage having a plurality of exhaust ports (not shown). In each of the cylinders 111-114, a piston (not shown) is received and a combustion chamber is defined. The combustion chambers are opened and closed by intake valves and exhaust valves. The engine 10 further includes ignition plugs (not shown). Also, the engine 10 includes a crankshaft 14 that is operatively linked with a plurality of pistons, and a camshaft 15 that is operatively linked with the crankshaft 14 and drives the intake valves or the exhaust valves. Also, a crank angle sensor 14a is provided for detecting the angle of rotation of the crankshaft 14. The crank angle sensor 14a is preferably capable of detecting the crank angle with high resolution of about 1 degree, for example, but is not limited to this.

The system 1 also includes a fuel tank 21, low-pressure pump 22, pressure regulator 23, low-pressure fuel pipe 25, low-pressure delivery pipe 26, port injection valves 271-274, and a fuel pressure sensor 28.

Gasoline as a fuel is stored in the fuel tank 21. The low-pressure pump 22 pressurizes the fuel and discharges it into the low-pressure fuel pipe 25. The pressure regulator 23 regulates the pressure of the fuel discharged into the low-pressure fuel pipe 25, to a preset low-pressure-side supply pressure.

The low-pressure fuel pipe 25 and the low-pressure delivery pipe 26 constitute one example of the low-pressure fuel supply passage through which the fuel discharged from the low-pressure pump 22 is supplied to the port injection valves 271-274. The fuel is drawn into the low-pressure delivery pipe 26 via the low-pressure fuel pipe 25, after its pressure is raised to a given pressure level by the low-pressure pump 22, and is regulated to the low-pressure-side supply pressure by the pressure regulator 23.

The port injection valves 271-274 are connected to the low-pressure delivery pipe 26, and inject the fuel into the intake ports 13 corresponding to the cylinders 111-114, respectively. The fuel pressure sensor 28, which will be described in detail later, detects the fuel pressure in the low-pressure delivery pipe 26. The ECU 41 obtains a detection value of the fuel pressure sensor 28 at fixed sampling time intervals.

The system 1 also includes a high-pressure pump 31, high-pressure fuel pipe 35, high-pressure delivery pipe 36, direct injection valves 371-374, and a fuel pressure sensor 38.

The high-pressure pump 31 sucks the fuel from a branch pipe 25a that branches off from the low-pressure fuel pipe 25, and pressurizes the fuel to a high pressure level that is higher than the level of the supply pressure from the low-pressure pump 22. The branch pipe 25a is provided with a pulsation damper 29 that suppresses fuel pressure pulsation in the branch pipe 25a.

More specifically, the high-pressure pump 31 includes a pump housing 31h, a plunger 31p that can slide in the pump housing 31h, and a pressurizing chamber 31a defined between the pump housing 31h and the plunger 31p. The volume of the pressurizing chamber 31a changes according to the displacement of the plunger 31p. When a solenoid valve 32 (which will be described later) is in an open state, the fuel pressurized by the low-pressure pump 22 is drawn into the pressurizing chamber 31a, via the branch pipe 25a. The fuel in the pressurizing chamber 31a is pressurized by the plunger 31p to a high pressure level, and discharged into the high-pressure fuel pipe 35.

A cam CP that drives the plunger 31p is mounted on the camshaft 15 of the engine 10. The shape of the cam CP is generally square with rounded corners. The high-pressure pump 31 has a follower lifter 31f that is moved up and down by the cam CP, and a spring 31g that biases the follower lifter 31f toward the cam CP. The plunger 31p is operatively linked with the follower lifter 31f, and moves up and down along with the follower lifter 31f. The camshaft 15 is operatively linked with the crankshaft 14 via a chain or a belt. The camshaft 15 and the cam CP are driven at a rotational speed that is a half of the rotational speed of the crankshaft 14.

The solenoid valve 32 is provided in a fuel inlet portion of the pressurizing chamber 31a of the high-pressure pump 31. The solenoid valve 32 has a valve body 32v, a coil 32c that drives the valve body 32v, and a spring 32k that constantly biases the valve body 32v in a valve-opening direction. The energization of the coil 32c (i.e., application of current to the coil 32c) is controlled by the ECU 41 via a driver circuit 42. When the coil 32c is energized, the valve body 32v shuts off communication between the branch pipe 25a of the low-pressure fuel pipe 25 and the pressurizing chamber 31a, against the bias force of the spring 32k. When the coil 32c is in a de-energized state, the valve body 32v is kept in an open state under the bias force of the spring 32k.

A check valve 34 with a spring is provided in the high-pressure fuel pipe 35 between the high-pressure delivery pipe 36 and the pressurizing chamber 31a. The check valve 34 opens when the fuel pressure on the pressurizing chamber 31a side becomes higher by a given amount than the fuel pressure on the high-pressure delivery pipe 36 side.

On the suction stroke of the high-pressure pump 31, the solenoid valve 32 is opened, and the plunger 31p moves downward, so that the pressurizing chamber 31a is filled with the fuel fed from the branch pipe 25a of the low-pressure fuel pipe 25. On the pressurizing stroke, the solenoid valve 32 is closed, and the volume of the pressurizing chamber 31a is reduced as the plunger 31p moves upward, so that the pressure of the fuel in the pressurizing chamber 31a is raised. On the discharge stroke, the check valve 34 opens when the force produced by the fuel pressure in the pressurizing chamber 31a becomes larger than the bias force of the spring of the check valve 34, and the fuel whose pressure has been raised is supplied to the high-pressure fuel pipe 35 and the high-pressure delivery pipe 36. As described above, rotation of the cam CP is utilized for moving the plunger 31p up and down, and the cam CP is operatively linked with the crankshaft 14 via the camshaft 15 so as to move along with the camshaft 15; therefore, the high-pressure pump 31 is driven in coordination with the crankshaft 14.

While the solenoid valve 32 is placed in the open state when it is not energized, the manner of operating the solenoid valve 32 is not limited to this. For example, the biasing directions of the coil 32c and the spring 32k may be respectively reversed, and the solenoid valve 32 may be arranged to be placed in the closed state when it is not energized. In this case, the coil 32c is energized on the fuel suction stroke, and is not energized on the pressurizing and discharge strokes.

The high-pressure fuel pressurized by the high-pressure pump 31 is fed to the high-pressure delivery pipe 36 via the high-pressure fuel pipe 35, and accumulated in the delivery pipe 36. The high-pressure fuel pipe 35 and the high-pressure delivery pipe 36 constitute one example of the high-pressure fuel supply passage through which high-pressure fuel is supplied from the high-pressure pump 31 to the direct injection valves 371-374.

The direct injection valves 371-374 directly inject the high-pressure fuel from the high-pressure delivery pipe 36 into the cylinders 111-114, respectively, in a predetermined order. The fuel pressure sensor 38 detects the fuel pressure in the high-pressure delivery pipe 36, and the ECU 41 obtains a detection value of the fuel pressure sensor 38, at fixed sampling time intervals.

The ECU 41 includes CPU (Central Processing Unit), ROM (Read-Only Memory), and RAM (Random Access Memory). The ECU 41 performs control for predicting a fuel pressure value as described later, according to a control program stored in advance in the ROM, based on information from sensors, information stored in advance in the ROM, etc. This control is performed by a center fuel pressure calculating unit, amplitude calculating unit, phase calculating unit, storage unit, predicting unit, obtaining unit, candidate calculating unit, provisional fuel pressure value calculating unit, candidate specifying unit, pulsation determining unit, and an injection start determining unit, which are functionally realized by the CPU, ROM, and RAM.

The ECU 41 calculates the required fuel injection amount commensurate with operating conditions of the engine 10 and an acceleration request. More specifically, the ECU 41 calculates an injection period of each of the port injection valves 271-274 corresponding to the required injection amount, and the fuel is injected from each of the port injection valves 271-274 for the calculated injection period, in a predetermined order, at intervals of a predetermined crank angle. The fuel injection from the group of direct injection valves 37 is carried out in the same manner.

The fuel injection amount of each of the fuel injection valves is proportional to a valve-open period in which the valve is open. The valve-open period is proportional to the energization period, i.e., the period of application of current to the electromagnetic coil of the fuel injection valve. Accordingly, the ECU 41 calculates the energization period of each of the port injection valves 271-274 according to the required injection amount, based on the detection value of the fuel pressure sensor 28. Similarly, the ECU 41 calculates the energization period of each of the direct injection valves 371-374 according to the required injection amount, based on the detected value of the fuel pressure sensor 38. The ECU 41 generates a command to the driver circuit 42, according to the calculated energization period. The driver circuit 42 energizes each of the port injection valves 271-274 and the direct injection valves 371-374 for the calculated energization period, according to the command from the ECU 41. In this manner, the fuel injection amount of each of the fuel injection valves is controlled.

Figure 2:
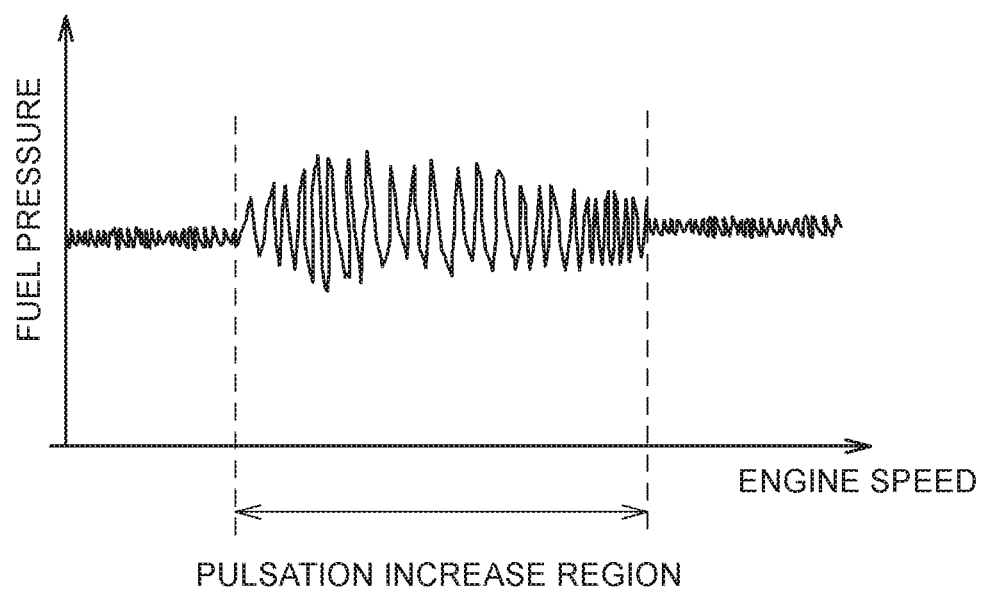
FIG. 2 is a waveform diagram of the fuel pressure.

Next, fuel pressure pulsation that occurs due to the high-pressure pump 31 will be described. FIG. 2 is a waveform diagram of the fuel pressure. In FIG. 2, the vertical axis indicates the fuel pressure, and the horizontal axis indicates the engine speed. As shown in FIG. 2, the engine speed range includes a pulsation increase region in which the amplitude of the fuel pressure pulsation in the low-pressure fuel pipe 25 and the low-pressure delivery pipe 26 increases to be larger than those in other regions. The pulsation increase region is a region in which the engine speed is in the range of 1000-1200 rpm, for example; however, the pulsation increase region is not limited to this region.

The amplitude of the fuel pressure pulsation may be increased for the following reason. In a given region of the engine speed, fuel injection is carried out by the group of port injection valves 27, without using the group of direct injection valves 37. During the fuel injection, the solenoid valve 32 is kept in the open state since the direct injection valves 37 are not used, and the plunger 31p repeatedly moves up and down with the power of the engine 10. Therefore, the suction and discharge of the fuel between the low-pressure fuel pipe 25 and the pressurizing chamber 31a are repeated, whereby the amplitude of pulsation is increased, and propagated to the low-pressure delivery pipe 26. Also, if the frequency of the fuel pressure pulsation as described above coincides with the natural frequency of the pulsation damper 29, resonance occurs, and the amplitude of the fuel pressure pulsation further increases.

Figure 3:
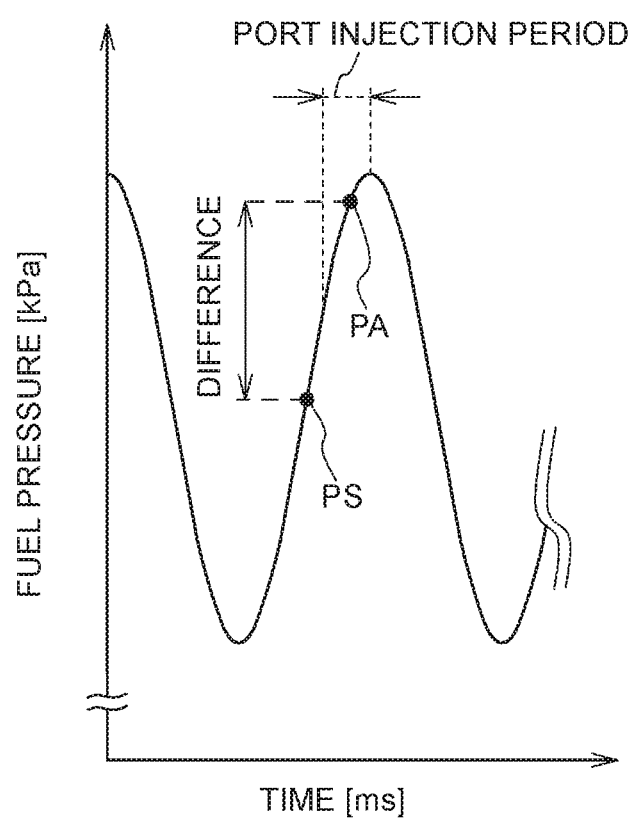
FIG. 3 is a graph showing one example of waveform of fuel pressure pulsation and a period of injection by a port injection valve.

FIG. 3 is a graph showing one example of the waveform of fuel pressure pulsation and an injection period of a port injection valve. In FIG. 3, the vertical axis indicates the fuel pressure, and the horizontal axis indicates time. FIG. 3 shows the waveform of pulsation in a condition where the engine speed belongs to the above-described pulsation increase region. Here, fuel pressure value PA is an actual fuel pressure value during a port injection period, and detection value PS is a detection value of the fuel pressure sensor 28 obtained by the ECU 41. Generally, the injection period of port injection is calculated, and the port injection amount is controlled, based on the detection value PS obtained before start of port injection. This is because the ECU 41 needs to complete calculation of the port injection period based on the obtained detection value of the fuel pressure sensor 28, before reaching the start time of port injection. Also, the ECU 41 is only able to obtain a detection value of the fuel pressure sensor 28 at fixed sampling time intervals. However, since the fuel pressure varies in a short time when the engine speed belongs to the above-described pulsation increase region, a difference between the detection value PS and the fuel pressure value PA may be large, as shown in FIG. 3. Therefore, if the port injection period is calculated based on the detection value PS, the port injection amount may not be controlled with high accuracy.

Accordingly, in this embodiment, the ECU 41 predicts a future fuel pressure value based on a model formula that will be described later. While an object to be controlled based on the predicted fuel pressure value is the port injection amount in this embodiment, the controlled object is not limited to this. In the following description, "detection value" means a detection value of the fuel pressure sensor 28, unless otherwise specified.

Figure 4A:
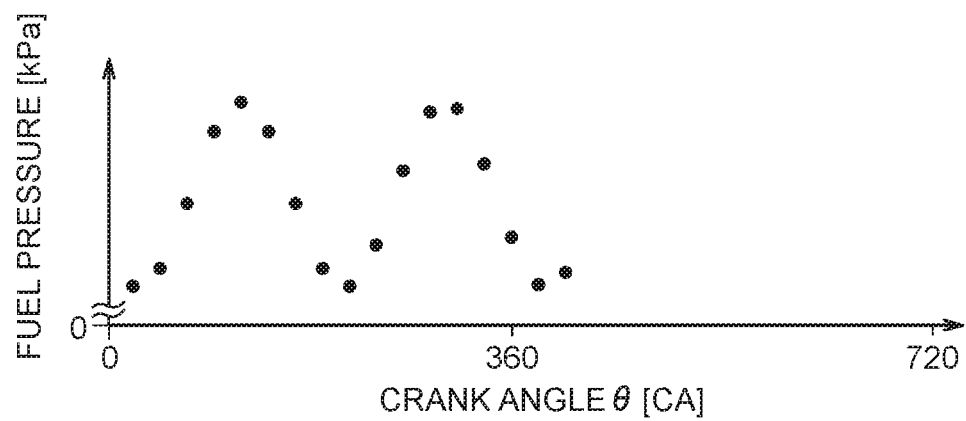
FIG. 4A is a graph indicating a plurality of detection values obtained by an ECU.
Figure 4B:
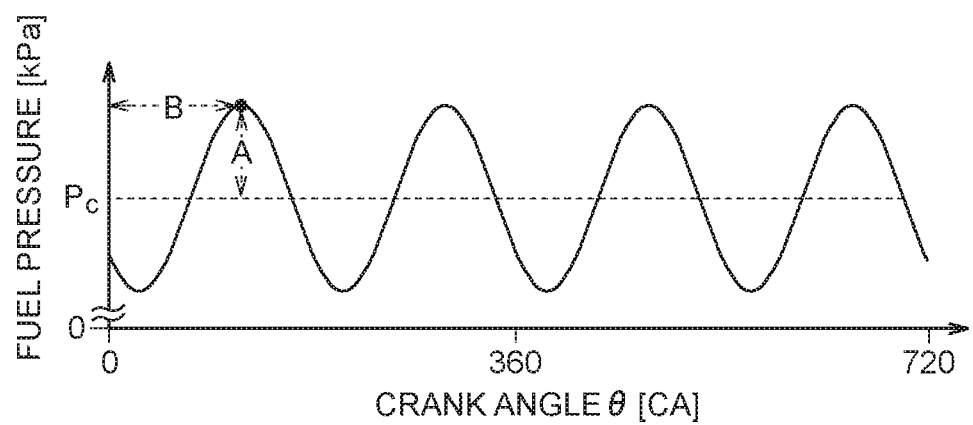
FIG. 4B is a graph indicating modeled fuel pressure pulsation.

As described above, the ECU 41 obtains a detection value at fixed sampling time intervals. FIG. 4A is a graph indicating a plurality of detection values obtained by the ECU 41. In FIG. 4A, the vertical axis indicates the fuel pressure, and the horizontal axis indicates the crank angle. As shown in FIG. 4A, in a known system, only the fuel pressure values at the current point in time and past points in time can be grasped. FIG. 4B is a graph indicating modeled fuel pressure pulsation that will be described below. In FIG. 4B, too, the vertical axis indicates the fuel pressure, and the horizontal axis indicates the crank angle. In this embodiment, a future fuel pressure value can be predicted by modeling the fuel pressure pulsation, as shown in FIG. 4B. Also, a fuel pressure value within the sampling time interval of detection values can be predicted.

More specifically, the ECU 41 predicts a fuel pressure value based on the following model formula (3).

$$P(\theta)=A\cos\{c(\theta-B)\}+P_c \quad (3)$$

In this formula (3), $\theta$ [deg] is the crank angle, $P(\theta)$ [kPa] is a fuel pressure value corresponding to the crank angle $\theta$, A [kPa] is the amplitude of the pulsation, B [deg] is the initial phase of the pulsation, c is the number of times of discharge of the fuel from the high-pressure pump 31 per 360 degrees of crank angle, in other words, the number of vibrations in the pulsation per 360 degrees of crank angle, and $P_c$ [kPa] is a center fuel pressure value of the pulsation. The center fuel pressure value $P_c$ is a center value of the amplitude A. The initial phase B is the crank angle established when the crank angle $\theta$ is closest to zero degree, and the amplitude A assumes the maximum value. The crank angle $\theta$ is equal to zero degree, when the piston of the cylinder 111 is located at the top dead center of the compression stroke.

Thus, the fuel pressure pulsation can be modeled by the formula using a trigonometric function, because the fuel pressure periodically changes due to rotation of the cam CP of the high-pressure pump 31, as described above. The center fuel pressure value P, amplitude A, and the initial phase B are calculated by the ECU 41, as will be described in detail later.

The number of times of discharge c is stored in advance in the ROM of the ECU 41. The number of times of discharge c is determined by the shape of the cam CP of the high-pressure pump 31. In this embodiment, the shape of the cam CP is generally square with rounded corners. Therefore, the cam CP rotates 180 degrees and the fuel is discharged twice per 360 degrees of crank angle. Accordingly, in this embodiment, the number of times of discharge c is 2. In the case where the cam is in the shape of a generally equilateral triangle with rounded corners, the cam rotates 180 degrees per 360 degrees of crank angle, and the number of times of discharge c is 1.5. In the case where the cam has a generally elliptical shape, the number of times of discharger per 360 degrees of crank angle is 1.

Next, port injection control performed based on the fuel pressure value predicted according to the model formula (3) will be described. FIG. 5 is a flowchart illustrating one example of port injection control. In the following description, "first latest fuel pressure value" means a detection value of the fuel pressure sensor 28 obtained by the ECU 41 most recently, and "second latest fuel pressure value" means a detection value of the fuel pressure sensor 28 obtained by the ECU 41 immediately before the first latest fuel pressure value is obtained, while "third latest fuel pressure value" means a detection value of the fuel pressure sensor 28 obtained by the ECU 41 immediately before the second latest fuel pressure value is obtained. Also, "next fuel pressure value" means a detection value of the fuel pressure sensor 28 which is expected to be obtained next time by the ECU 41.

The ECU 41 determines whether the engine speed [rpm] calculated based on the output of the crank angle sensor 14a is lower than a predetermined threshold value (step S1). The threshold value is defined as the upper limit of the engine speed at which port injection can be requested, and is set to a value that is larger than the engine speeds in the pulsation increase region. If a negative decision (NO) is made in step S1, it is determined that no port injection is carried out, and this control routine ends.

If an affirmative decision (YES) is made in step S1, the ECU 41 obtains a predetermined number of detection values, and stores them in the RAM (step S2). If the predetermined number of detection values that have already been obtained are stored in the RAM, they are successively updated such that the oldest one of the stored detection values is replaced with a newly obtained detection value. The predetermined number, which will be described in detail later, is the number of detection values needed to calculate the center fuel pressure value $P_c$. Also, the operation of step S2 is performed for the sake of calculation of the amplitude A and the initial phase B. The detection values obtained and stored in step S2 include at least the second latest fuel pressure value and the first latest fuel pressure value as two latest detection values. The operation of step S2 is one example of operation performed by the obtaining unit that obtains detection values of the fuel pressure sensor 28 at fixed sampling time intervals.

Then, the ECU 41 executes a center fuel pressure calculation routine for calculating the center fuel pressure value $P_c$ of pulsation based on at least the second latest fuel pressure value and the first latest fuel pressure value, which were stored in the RAM in step S2 (step S3). Accordingly, even when the engine speed does not belong to the above-described pulsation increase region, the center fuel pressure calculation routine is executed. This is because the fuel pressure value can be immediately predicted according to the model formula (3) when the engine speed belongs to the pulsation increase region. The operation of step S3 is one example of operation performed by the center fuel pressure calculating unit that calculates the center fuel pressure value $P_c$ of pulsation. The center fuel pressure calculation routine of step S3 will be described in detail later.

Then, the ECU 41 determines whether the engine speed belongs to the above-described pulsation increase region (step S4). The pulsation increase region is calculated in advance by experiment and stored in the ROM. The operation of step S4 is one example of operation performed by the pulsation determining unit that determines whether the engine speed calculated based on the output of the crank angle sensor 14a belongs to the above-described pulsation increase region.

If a negative decision (NO) is made in step S4, it is determined that the fuel pressure value does not vary largely, and the ECU 41 executes a normal port injection routine (step S15). In the normal port injection routine, the prediction of the fuel pressure value as described above is not conducted, but each injection period is calculated, based on a detection value obtained by the ECU 41 immediately before the injection start time of each of the port injection valves 27. This is because, when the amplitude of pulsation is relatively small, a difference between the detection value obtained immediately before the injection start time and a fuel pressure value obtained during port injection is also small, and the port injection amount can be appropriately controlled. After execution of the normal port injection routine, step S1 and subsequent steps are executed again.

If an affirmative decision (YES) is made in step S4, the ECU 41 stores the crank angle at the time when the first latest fuel pressure value was obtained in step S2, in the RAM (step S5). When the engine speed belongs to the pulsation increase region, the crank angle at the time of acquisition of the first latest fuel pressure value is updated each time a new detection value is obtained. Then, the ECU 41 converts the sampling time interval stored in advance in the ROM, into the crank angle, based on the latest engine speed (step S6). The engine speed is taken into consideration, because the sampling time interval is constant or fixed whereas the engine speed varies. Then, the ECU 41 adds the crank angle corresponding to the sampling time interval to the crank angle at the time of acquisition of the first latest fuel pressure value, to calculate the crank angle at the time when the next fuel pressure value is expected to be obtained (step S7).

Then, the ECU 41 determines, based on the crank angle at the time when the next fuel pressure value is expected to be obtained, whether the injection start time of any of the port injection valves 27 is prior to acquisition of the next fuel pressure value, namely, any of the port injection valves 27 starts fuel injection before the next fuel pressure value is obtained (step S8). It is possible to make the above determination, since the injection start time of any of the port injection valves 27 is stored in advance in the RAM in association with the crank angle. Steps S5-S7 are required so as to perform the determining operation of step S8. The operation of steps S5-S8 is one example of operation performed by the injection start determining unit that determines whether any of the port injection valves 27 starts fuel injection, after acquisition of the first latest fuel pressure value and before acquisition of the next fuel pressure value. If a negative decision (NO) is made in step S8, step S1 and subsequent steps are executed again, and the center fuel pressure calculating routine is continued.

If an affirmative decision (YES) is made in step S8, the ECU 41 performs an amplitude calculation routine for calculating the amplitude A of pulsation, based on at least the second latest fuel pressure value and the first latest fuel pressure value, which are stored in the RAM in step S2 (step S9). The details will be described later. Then, the ECU 41 executes a phase calculation routine for calculating the initial phase B, based on at least one of the second latest fuel pressure value and the first latest fuel pressure value, which are stored in the RAM in step S2 (step S10). The details will be described later. In the manner as described above, each term of the model formula (3) is calculated, through the routines of steps S3, S9 and S10.

Then, the ECU 41 predicts a fuel pressure value corresponding to a crank angle during the injection period of the port injection valve that is expected to inject fuel next time (step S11). More specifically, the values calculated through the routines of steps S3, S9 and S10 are substituted into respective terms of the model formula (3), so that a fuel pressure value at a given crank angle is predicted. Here, values of the respective terms of the model formula (3) are calculated based on detection values of the fuel pressure sensor which reflect the actual fuel pressure values. Therefore, the values of the respective terms of the model formula (3) are calculated with high accuracy, and the future fuel pressure value can be predicted with high accuracy, based on the model formula (3). The operation of step S11 is one example of operation performed by a predicting unit that predicts a fuel pressure value $P(\theta)$ [kPa] corresponding to the crank angle $\theta$ [deg], based on the center fuel pressure value $P_c$, amplitude A, initial phase B, the number of times of discharge c, and the model formula (3). Also, the operation of step S11 is one example of operation performed by the predicting unit that predicts the fuel pressure value $P(\theta)$, when the port injection valve starts fuel injection after the first latest fuel pressure value was obtained, and before the next detection value is obtained.

The ECU 41 calculates the energization period of the port injection valve that is expected to inject fuel next time, based on the predicted fuel pressure value (step S12). More specifically, the energization period of the port injection valve that is expected to inject fuel next time is calculated based on the predicted fuel pressure value, so that the fuel is injected by the required injection amount that is set according to the requirement for operation of the engine 10. More specifically, the energization period [M S] is calculated according to the following equation.

$$\tau = (Q/Q_{INJ}) \times \sqrt{P_0/P(\theta)} \times 60 \times 1000 \quad (4)$$

Q[mL] is the required injection amount. $Q_{INJ}$[mL/min.] is the nominal flow rate of each of the port injection valves 271-274. $P_0$ is the test pressure corresponding to the nominal flow rate of each of the port injection valves 271-274. $Q_{INJ}$ and $P_0$ are calculated in advance by experiment, and stored in the ROM. $P(\theta)$ [kPa] is a fuel pressure value predicted according to the model formula (3).

Then, the ECU 41 determines whether the crank angle at the present time has reached that of the injection start time of the next port injection valve, based on the detection value of the crank angle sensor 14a (step S13). If a negative decision (NO) is made in step S13, step S13 is executed again. If an affirmative decision (YES) is made in step S13, the ECU 41 performs port injection by energizing the port injection valve expected to inject fuel, for the calculated energization period (step S14). The operation of steps S12-S14 is one example of operation performed by an injection controller that controls the fuel injection amount of the port injection valve, based on the predicted fuel pressure value $P(\theta)$.

As described above, before the injection start time of the port injection valve expected to inject fuel is reached, a fuel pressure value within an expected period of execution of port injection is predicted, and the energization period of the port injection valve is calculated based on the predicted fuel pressure value. Therefore, even when the amplitude of pulsation is large, the fuel injection amount of the port injection valves can be controlled with high accuracy, and the air-fuel ratio can be controlled with high accuracy. Also, the amplitude A and the initial phase B are calculated only when an affirmative decision (YES) is made in step S8, and the fuel pressure value is predicted; thus, the fuel pressure value is predicted only when it is necessary, and the processing load of the ECU 41 is less likely or unlikely to be increased.

The future fuel pressure value predicted according to the model formula (3) may be used for control other than control of the fuel injection amount of the port injection valve. For example, the ignition timing, etc. of the ignition plug may be controlled based on the predicted future fuel pressure value. When it takes a certain period from the time when a detection value of a sensor is obtained to the time when computation for controlling a controlled object is completed, it is useful or beneficial to use the predicted fuel pressure value as described above, in place of the detection value of the sensor.

Also, even when the engine speed does not belong to the above-described pulsation increase region, the future fuel pressure value may be predicted according to the model formula (3). For example, since the low-pressure pump 22 is feedback-controlled as will be described later, the fuel pressure may slightly pulsate or fluctuate due to variations in rotation of the low-pressure pump 22 even when the engine speed is not included in the pulsation increase region.

Next, a plurality of examples of the center fuel pressure calculation routine will be described. The ECU 41 calculates the center fuel pressure value $P_c$ by executing any of the plurality of examples of the center fuel pressure calculation routine as described below.

Figure 6:
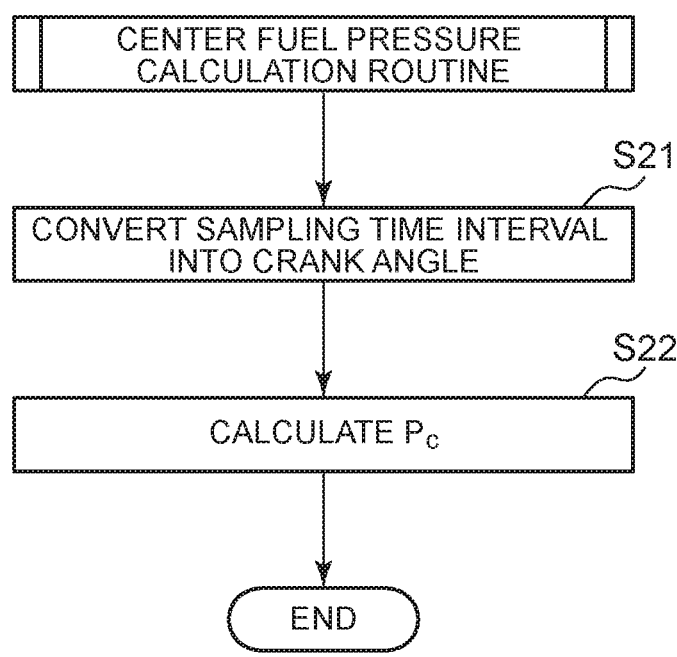
FIG. 6 is a flowchart illustrating a first example of center fuel pressure calculation routine.

Initially, a first example of center fuel pressure calculation routine will be described. In the first example, the center fuel pressure value $P_c$ is calculated, based on the third latest fuel pressure value, the second latest fuel pressure value, and the first latest fuel pressure value, which were obtained in step S2, and the crank angle corresponding to the sampling time interval. FIG. 6 is a flowchart showing the first example of center fuel pressure calculation routine. The ECU 41 converts the sampling time interval to the crank angle (step S21). In step S21, a method similar to that of step S6 is used.

Where "t [deg]" denotes the crank angle corresponding to the sampling time interval, and "a" denotes a coefficient, the third latest fuel pressure value $P_1$ [kPa], second latest fuel pressure value $P_2$ [kPa], and the first latest fuel pressure value $P_3$ [kPa] are respectively expressed by the following equations:

$$P_1 = A\sin(a) + P_c \quad (5)$$

$$P_2 = A\sin(a+t) + P_c \quad (6)$$

$$P_3 = A\sin(a+2t) + P_c \quad (7)$$

If the amplitude A is eliminated by using the above equations (5) and (6), the center fuel pressure value $P_c$ is expressed by the following equation (8).

$$P_c = \frac{P_2 \sin(a) - P_1 \sin(a+t)}{\sin(a) - \sin(a+t)} \quad (8)$$

If a coefficient P' is defined as $P' = (P_2 - P_1)/(P_3 - P_1)$, the coefficient P' will be expressed by the following equation (9), which is derived from the above equations (5)-(8).

$$P' = \frac{\sin(a+t) - \sin(a)}{\sin(a+2t) - \sin(a)} \quad (9)$$

If the coefficient "a" of the above equation (9) is solved, it is expressed by the following equation.

$$a = \tan^{-1}\left\{\frac{\sin(t) - P'\sin(2t)}{P'\cos(2t) - P' - \cos(t) + 1}\right\} \quad (10)$$

Accordingly, the ECU 41 calculates the center fuel pressure value $P_c$, by substituting Eq. (8) into Eq. (10) (step S22). In the manner as described above, the center fuel pressure value $P_c$ can be calculated in a short period, based on the third latest fuel pressure value $P_1$, second latest fuel pressure value $P_2$, and the first latest fuel pressure value $P_3$ as three latest detection values, and the crank angle t corresponding to the sampling time interval.

The coefficient "a" is expressed in Eq. (10), using the coefficient P', because the coefficient P' is determined only by the third latest fuel pressure value $P_1$, second latest fuel pressure value $P_2$, and the first latest fuel pressure value $P_3$ as detection values of the fuel pressure sensor 28, and the use of the coefficient P' makes it easy to calculate the coefficient "a". As a result, the center fuel pressure value $P_c$ can be easily calculated, and otherwise possible increase of the processing load of the ECU 41 and prolongation of the calculation period are curbed.

In the first example of center fuel pressure calculation routine, the center fuel pressure value $P_c$ is calculated based on three latest detection values as described above; therefore, the predetermined number in step S2 may be 3 or more.

Figure 7:
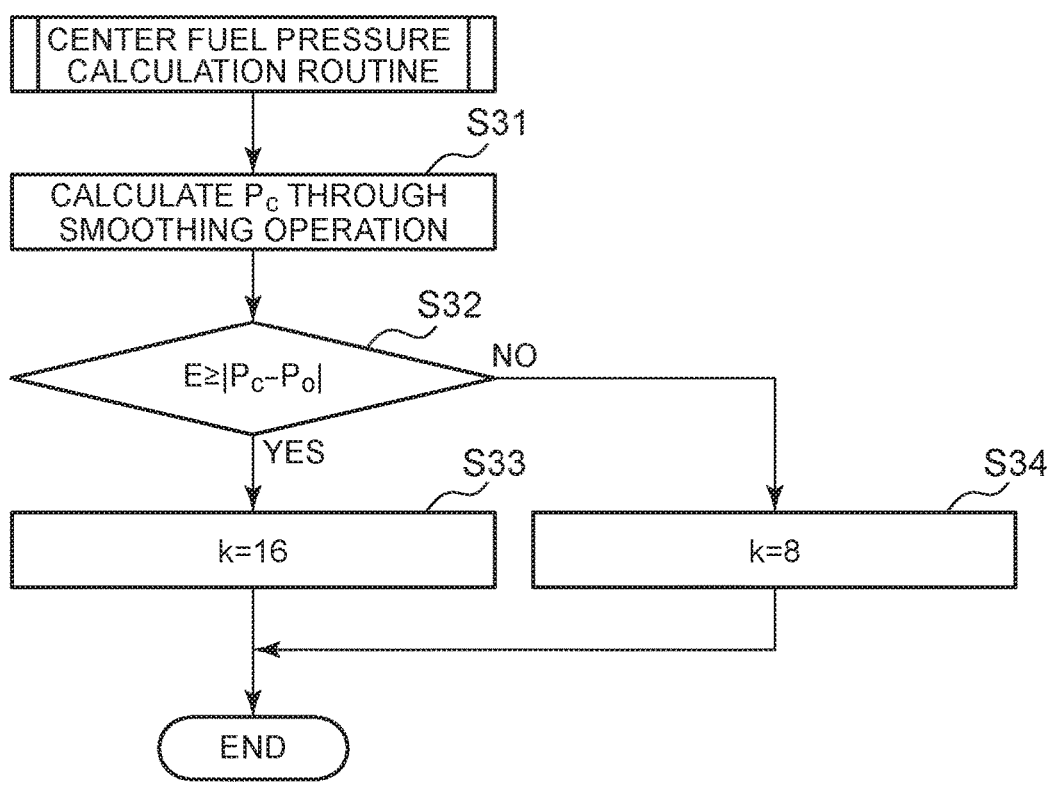
FIG. 7 is a flowchart illustrating a second example of center fuel pressure calculation routine.

Next, a second example of center fuel pressure calculation routine will be described. In the second example, a smoothed value of detection values is calculated as the center fuel pressure value $P_c$. FIG. 7 is a flowchart illustrating the second example of center fuel pressure calculation routine.

The ECU 41 calculates a smoothed value P' [kPa] as the center fuel pressure value $P_c$, based on the predetermined number of detection values obtained in step S2, according to the following equation (step S31).

$$P'_n = P'_{n-1} \times \frac{(k-1)}{k} + \frac{P_n}{k} \quad (11)$$

In the above equation, $P'_n$ is a smoothed value calculated in this cycle, $P'_{n-1}$ [kPa] is a smoothed value calculated in the last cycle, $P_n$ [kPa] is the first latest fuel pressure value, and k [-] is a smoothing coefficient. The initial value of the smoothing coefficient k is 16. T The smoothed value $P'_n$ is calculated based on the first latest fuel pressure value $P_n$, and the smoothed value $P'_{n-1}$ calculated in the last cycle, based on the second latest fuel pressure value $P_{n-1}$. Thus, at least the second latest fuel pressure value and the first latest fuel pressure value as two latest detection values are required for calculating the smoothed value P'.

Figure 8:
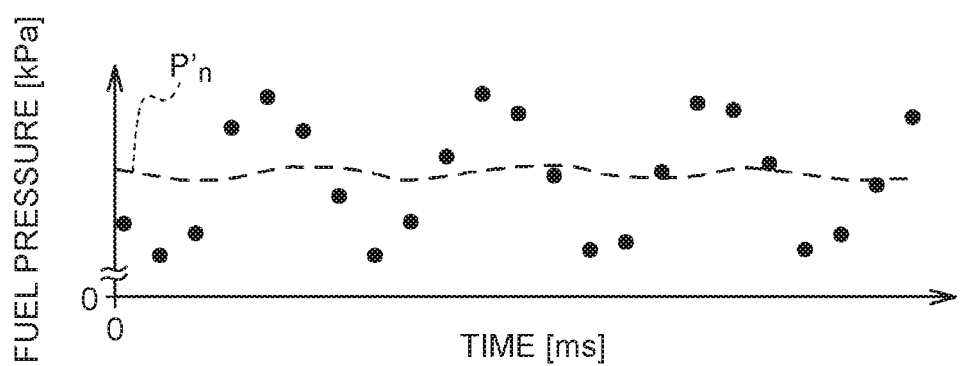
FIG. 8 is a graph indicating obtained detection values and smoothed values.

FIG. 8 is a graph indicating the obtained detection values and smoothed value P'. In FIG. 8, black circles indicate detection values obtained by the ECU 41. The smoothed value $P'_n$ shown in FIG. 8 is obtained where the smoothing coefficient k is 16, and represents the center fuel pressure value $P_c$. In FIG. 8, the dashed line continuously indicates smoothed values P' each calculated each time a detection value is obtained. The calculation of each smoothed value $P'_n$ is performed each time a detection value is obtained during pulsation. Since the center fuel pressure value $P_c$ is calculated based on the plurality of detection values, the center fuel pressure value $P_c$ is calculated with high accuracy. When the smoothing operation is performed for the first time based on the first latest fuel pressure value, and there is no smoothed value calculated in the last cycle, the smoothed value P' is calculated using the second latest fuel pressure value as the smoothed value $P'_{n-1}$.

Then, the ECU 41 determines whether an absolute value of a difference between the center fuel pressure value $P_c$ calculated through the above-described smoothing operation and a target fuel pressure value $P_0$ [kPa] is equal to or larger than a predetermined value E [kPa] (step S32). The target fuel pressure value $P_0$ is a target value of the fuel pressure in the low-pressure delivery pipe 26, and is set to such a low pressure that the fuel will not boil under reduced pressure, for example. The ECU 41 performs feedback control on the voltage applied to the low-pressure pump 22, so that the smoothed value of the detection values becomes closer to the target fuel pressure value $P_0$. Thus, the pulsation is mainly caused by the high-pressure pump 31, whereas the center fuel pressure $P_c$ of the pulsation mainly depends on the low-pressure pump 22.

If an affirmative decision (YES) is made in step S32, namely, if $E \geq |P_c - P_0|$ is satisfied, the ECU 41 sets the smoothing coefficient k to 16 (step S33). This case where $E \geq |P_c - P_0|$ is satisfied means that the difference between the center fuel pressure value $P_c$ and the target fuel pressure value $P_0$ is small, and the center fuel pressure value $P_c$ can be calculated with high accuracy, by setting the smoothing coefficient k to a large value. Thus, as long as an affirmative decision (YES) is made in step S32, the smoothing operation is performed with the smoothing coefficient k set to 16 each time a new detection value is obtained.

On the other hand, if a negative decision (NO) is made in step S32, namely, if $E \geq |P_c - P_0|$ is not satisfied, the ECU 41 sets the smoothing coefficient k to 8 (step S34). The case where $E \geq |P_c - P_0|$ is not satisfied means that the difference between the center fuel pressure value $P_c$ and the target fuel pressure value $P_0$ is large. In this case, the low-pressure pump 22 is controlled so that the fuel pressure in the low-pressure delivery pipe 26 becomes closer to the target fuel pressure value $P_0$. Accordingly, in this case, the fuel pressure in the low-pressure delivery pipe 26, namely, the actual center fuel pressure value, transiently changes so that it becomes closer to the target fuel pressure value $P_0$. In this case, changes in the actual fuel pressure are more likely to be reflected by the smoothed value $P'_n$ in the case where the smoothing coefficient k is small, as compared with the case where the smoothing coefficient k is large. Therefore, by setting the smoothing coefficient k to 8, it is possible to calculate the center fuel pressure value $P_c$ in accordance with transient changes of the fuel pressure.

In the second example of center fuel pressure calculation routine, the center fuel pressure value $P_c$ is calculated based on the latest two detection values as described above. Therefore, the predetermined number in step S2 may be 2 or more.

While the minimum value of the smoothing coefficient k is 6, for example, it is not limited to this value, but the smoothing coefficient k is only required to be smaller in the case where the difference between the target fuel pressure value $P_o$ and the center fuel pressure value $P_c$ is large, as compared with the case where the same difference is small. Accordingly, the smoothing coefficient k may be set to a smaller value as the difference between the target fuel pressure value $P_0$ and the calculated center fuel pressure value $P_c$ is larger. The minimum value of the smoothing coefficient k is set, in view of the sampling period, the amplitude of the fuel pressure measured by experiment, or the like, when resonance occurs, the maximum rate of change of the center fuel pressure value, etc., for example. The smoothed value of the fuel pressure used for control of the low-pressure pump 22 may be the same as or different from the smoothed value used for calculation of the center fuel pressure value $P_c$.

Figure 9:
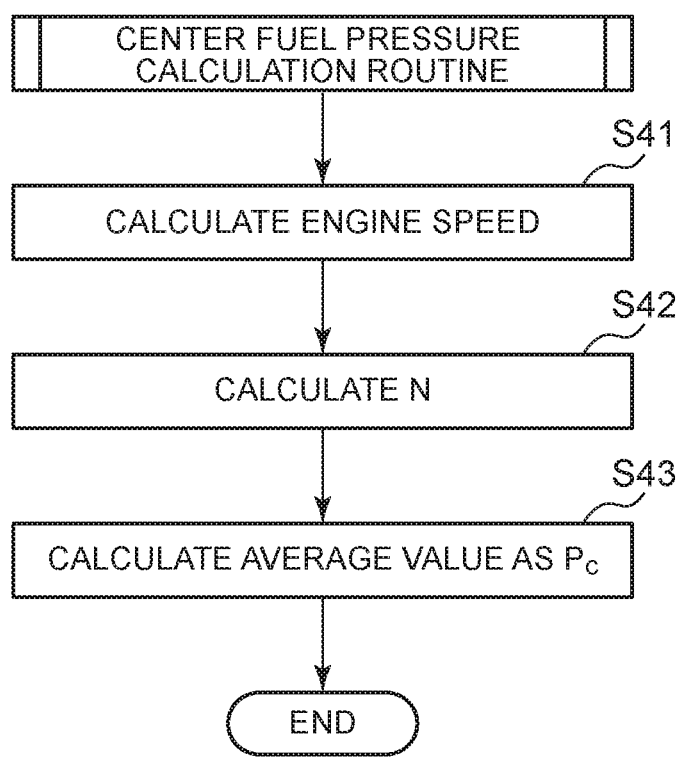
FIG. 9 is a flowchart illustrating a third example of center fuel pressure calculation routine.

Next, a third example of center fuel pressure calculation routine will be described. In the third example, the ECU 41 calculates the average value of the obtained detection values, as the center fuel pressure value $P_c$. FIG. 9 is a flowchart illustrating the third example of center fuel pressure calculation routine.

The ECU 41 calculates the engine speed based on the output signal of the crank angle sensor 14a (step S41), and calculates the number N of samples of detection values used for calculation of the center fuel pressure value $P_c$ (step S42). More specifically, the number N of samples is calculated according to an equation that $N = \{60000/(Ne \cdot Ts \cdot c)\} \pm 1$, based on the engine speed Ne [rpm], sampling time interval Ts [ms] at which the detection values are obtained, and the number c of times of discharge. The calculated value is rounded to unit, to provide the number (integer) N of samples. Here, the sampling time interval Ts is stored in advance in the ROM of the ECU 41.

Figure 10A:
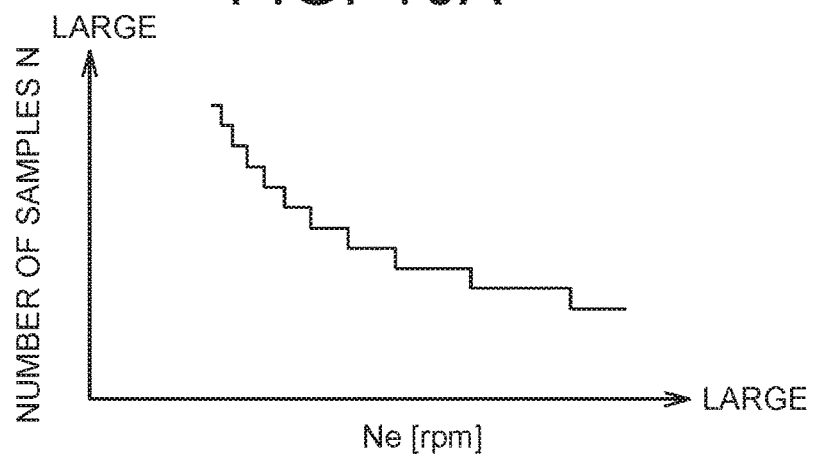
FIG. 10A is a graph indicating the relationship between the number of samples of detection values used for calculation of the center fuel pressure value, and the engine speed.

FIG. 10A is a graph indicating the relationship between the number N of samples of detection values used for calculation of the center fuel pressure value $P_c$, and the engine speed. In FIG. 10A, the vertical axis indicates the number N of samples, and the horizontal axis indicates the engine speed.

The calculated number N of samples corresponds to the number of detection values obtained per approximate one period of pulsation. The period of pulsation becomes shorter as the engine speed increases, namely, as the rotational speed of the cam CP of the high-pressure pump 31 increases. On the other hand, the sampling time intervals at which the detection valves are obtained are fixed or constant, as described above. Therefore, as the engine speed increases, the number of the detection values obtained during one period of pulsation is reduced. Accordingly, as shown in FIG. 10A, the number N of samples is reduced as the engine speed increases.

Then, the ECU 41 calculates the average value of the calculated sample number N of detection values, as the center fuel pressure value $P_c$ (step S43). The detection values retrieved as samples include the first latest fuel pressure value, and those successively detected before the latest value.

Figure 10B:
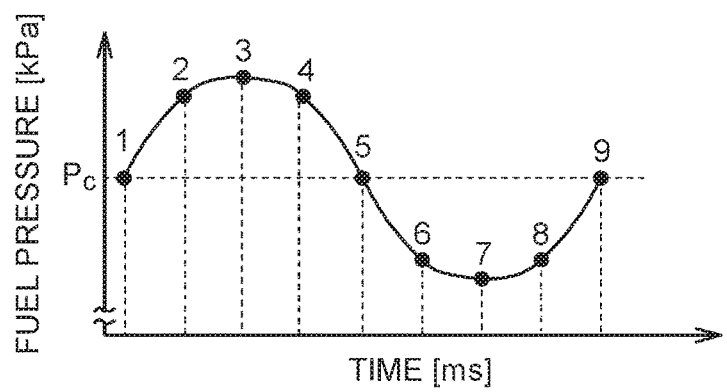
FIG. 10B is a graph indicating the fuel pressure pulsation and the number of samples, when the engine speed is lower than a predetermined speed.
Figure 10C:
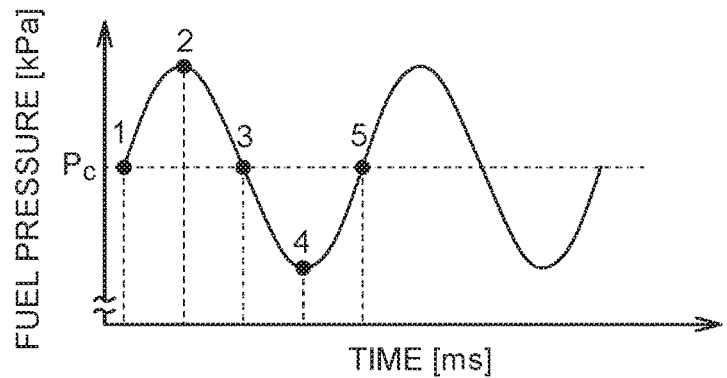
FIG. 10C is a graph indicating the fuel pressure pulsation and the number of samples, when the engine speed is higher than the predetermined speed.

FIG. 10B and FIG. 10C are graphs indicating the fuel pressure pulsation and the sample number. FIG. 10B shows the case where the engine speed is smaller than a predetermined speed, and FIG. 10C shows the case where the engine speed is larger than the predetermined speed. In FIG. 10B, the number N of samples is 9. In FIG. 10C, the number N of samples is 5.

The ECU 41 calculates the average value of the detection values as the center fuel pressure value $P_c$, each time detection values of a predetermined number N of samples are obtained. Thus, the ECU 41 can calculate the center fuel pressure value $P_c$ with high accuracy, in accordance with change of the engine speed. Also, the center fuel pressure value Pc can be calculated by a simple method; therefore, otherwise possible increase of the processing load of the ECU 41 and prolongation of the calculating operation are curbed.

The ECU 41 may determine the number N of samples, based on a map, such as that of FIG. 10A stored in advance in the ROM, rather than based on the calculation formula as described above.

Also, the number of samples may be set to 2, when the sampling time interval Ts is relatively long, and the engine speed Ne is relatively high, or when the number of times of discharge C is relatively large. Therefore, in the third example of center fuel pressure calculation routine, the predetermined number in step S2 is at least 2 (2 or more), since the center fuel pressure value $P_c$ can be obtained based on the latest two detection values.

The three examples of center fuel pressure calculation routines have been described above. In any of these cases, the center fuel pressure value $P_c$ is calculated, based on at least the second largest fuel pressure value and the first latest fuel pressure value.

Next, the amplitude calculation routine will be described. Where $\theta_n$ and $\theta_{n-1}$ denote respective crank angles at the time when the first latest fuel pressure value $P_n$ and the second latest fuel pressure value $P_{n-1}$ were obtained, the first latest fuel pressure value $P_n$ and the second latest fuel pressure value $P_{n-1}$ can be expressed by the following equations (12) and (13), respectively.

$$P_{n-1} = A\cos\{c(\theta_{n-1} - B)\} \quad (13)$$

The above equations (12) and (13) do not include the center fuel pressure value $P_c$, because there is no influence on calculation results of the amplitude A and the initial phase B even if the center fuel pressure value $P_c$ is regarded as zero.

Here, crank angle $\theta_{AD}$ [deg] corresponding to the sampling time interval can be expressed as $\theta_{AD} = \theta_n - \theta_{n-1}$. Accordingly, the amplitude A can be expressed as follows, based on Eq. (12) and Eq. (13).

$$A = \sqrt{\frac{(P_{n-1} \cdot \cos\theta_{AD} - P_n)^2}{\sin^2\theta_{AD}} + P_{n-1}^2} \quad (14)$$

Thus, the amplitude A is expressed by a simple equation, without using the center fuel pressure value $P_c$, but using the first latest fuel pressure value $P_n$ and the second latest fuel pressure value $P_{n-1}$, and the crank angle $\theta_{AD}$ corresponding to the sampling time interval. Since the amplitude A can be calculated based on the simple equation (14), the processing load of the ECU 41 is less likely or unlikely to be increased, and the period of the calculation routine is less likely or unlikely to be prolonged.

Figure 11:
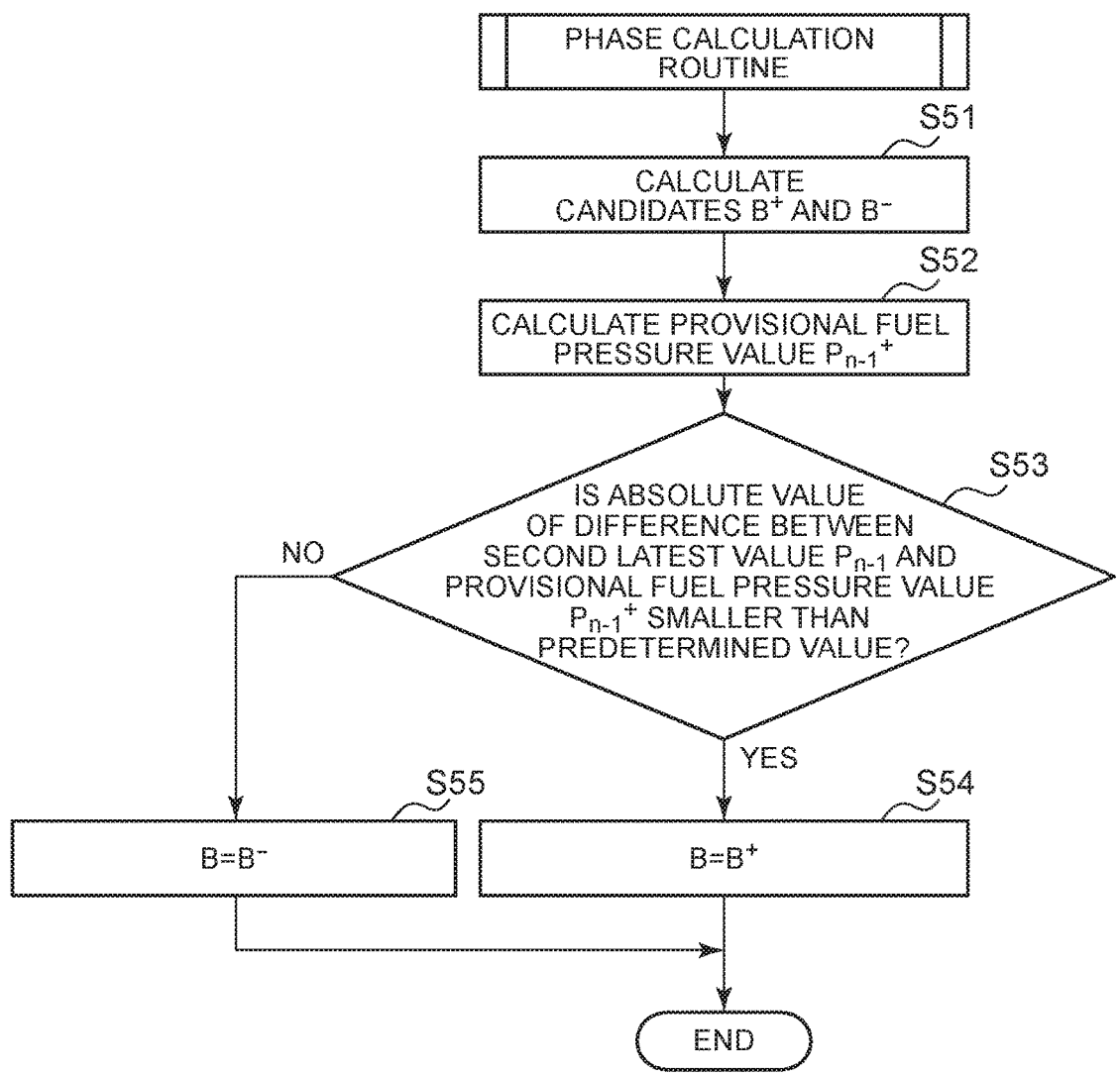
FIG. 11 is a flowchart illustrating one example of phase calculation routine.

Next, the phase calculation routine will be described. FIG. 11 is a flowchart illustrating one example of phase calculation routine. The ECU 41 calculates two candidates, i.e., candidate $B^+$ and candidate $B^-$, of the initial phase B, based on the following equation (15) calculated based on Eq. (12) (step S51).

$$B = \theta_n \pm \left\{\cos^{-1}\left(\frac{P_n}{A}\right) \cdot \frac{1}{c}\right\} \quad (15)$$

Here, $B^+$ is defined as $B^+ = \theta_n + \{\cos^{-1}(P_n/A) \times (1/c)\}$, and $B^-$ is defined as $B^- = \theta_n + \{\cos^{-1}(P_n/A) \times (1/c)\}$. Thus, the candidates $B^+$ and $B^-$ can be easily expressed using the crank angle $\theta_n$ at the time when the first latest fuel pressure value $P_n$ was obtained, the first latest fuel pressure value $P_n$, the amplitude A, and the number of times of discharge c. In Eq. (15), the crank angle $\theta_n$ and the second latest fuel pressure value $P_{n-1}$ may be used, in place of the crank angle $\theta_n$ and the first latest fuel pressure value $P_n$. In this case, too, the initial phase B theoretically has the same value. Step S51 is one example of operation performed by the candidate calculating unit that calculates two candidates $B^+$ and $B^-$ of the initial phase B, based on one of the second latest fuel pressure value $P_{n-1}$, and the first latest fuel pressure value $P_n$, the crank angle at the time when one of the second latest fuel pressure value $P_{n-1}$ and the first latest fuel pressure value $P_n$ was obtained, the number of times of discharge c, and the calculated amplitude A.

To specify a true solution of the initial phase B, it may be considered to specify the true solution, based on whether a provisional fuel pressure value obtained by substituting any one of the two candidates $B^+$ and $B^-$ into the model formula (3) coincides with the actual detection value. For example, a provisional fuel pressure value $P_{n-1}^+$ is calculated by substituting the calculated center fuel pressure value $P_c$, amplitude A, crank angle $\theta_{n-1}$, and the candidate $B^+$, into the model formula (3). The candidate $B^+$ is a true solution when the provisional fuel pressure value $P_{n-1}^+$ calculated based on the candidate $B^+$ coincides with the second latest fuel pressure value $P_{n-1}$ corresponding to the provisional fuel pressure value $P_{n-1}^+$, and the candidate $B^-$ is a true solution when these values do not coincide with each other. However, even when the true solution of the initial phase B is the candidate $B^+$, the provisional fuel pressure value $P_{n-1}^+$ and the second latest fuel pressure value $P_{n-1}$ may not coincide with each other, due to a calculation error of the center fuel pressure value $P_c$, etc., and there is a possibility that the initial phase B thus calculated is an erroneous value.

Accordingly, the ECU 41 calculates the provisional fuel pressure value $P_{n-1}^+$, by substituting the calculated center fuel pressure value $P_c$, amplitude A, crank angle $\theta_{n-1}$, and the candidate $B^+$, into the model formula (3) (step S52).

Then, it is determined whether an absolute value of a difference between the second latest fuel pressure value $P_{n-1}$ and the above-described provisional fuel pressure value $P_{n-1}^+$ is smaller than a predetermined value (step S53). More specifically, the determination is made based on the following expression (16).

$$|P_{n-1} - \{A\cos\{c(\theta_{n-1} - B^+)\} + P_c\}| < \varepsilon \quad (16)$$

"$A\cos\{c(\theta_{n-1} - B^+)\} + P_c$" in the left side of the above expression (16) means the provisional fuel pressure value $P_{n-1}^+$ calculated based on the above-described candidate $B^+$. The predetermined value $\varepsilon$[kPa] is slightly larger than the maximum error that can be generated between the provisional fuel pressure value $P_{n-1}^+$ and the second largest fuel pressure value $P_{n-1}$, in the case where the true solution of the initial phase B is the candidate $B^+$. The predetermined value $\varepsilon$[kPa] is calculated in advance by experiment, and stored in the ROM. When the above expression (16) is satisfied, the ECU 41 specifies the candidate $B^+$ as the initial phase B (step S54). If the expression (16) is not satisfied, the ECU 41 specifies the candidate $B^-$ as the initial phase B (step S55). Since the predetermined value $\varepsilon$ is stored in advance in the ROM, the processing load of the ECU 41 is less likely or unlikely to be increased.

As described above, the initial phase B can be finally calculated based on the simple inequality (16); therefore, it is possible to calculate the initial phase B with high accuracy, while curbing increase of the processing load of the ECU 41 and prolongation of the calculation routine. Thus, the future fuel pressure value finally predicted according to the model formula (3) can be predicted with high accuracy.

Step S52 is one example of operation performed by the provisional fuel pressure value calculating unit that calculates the provisional fuel pressure value $P_{n-1}^{+}$, by substituting the calculated amplitude A and center fuel pressure value $P_c$, one of the two candidates $B^+$ and $B^-$, and the crank angle $\theta_{n-1}$ at the time when the second latest fuel pressure value $P_{n-1}$ was obtained, into the model formula (3).

Steps S53-S55 are one example of the candidate specifying unit that specifies the candidate $B^+$ as the initial phase B when the absolute value of the difference between the calculated provisional fuel pressure value $P_{n-1}^{+}$, and the second latest fuel pressure value $P_{n-1}$ corresponding to the provisional fuel pressure value $P_{n-1}^{+}$ is smaller than the predetermined value, and specifies the candidate $B^-$ as the initial phase B when the absolute value of the difference exceeds the predetermined value.

In the above-indicated expression (16), the inequity sign may be reversed. In this case, the candidate $B^-$ is specified as the initial phase B when the expression (16) is satisfied, and the candidate $B^+$ is specified as the initial phase B when it is not satisfied.

Also, in the expression (16), the candidate $B^-$ may be used in place of the candidate $B^+$. In this case, too, the candidate $B^-$ is specified as the initial phase B when the expression (16) is satisfied, and the candidate $B^+$ is specified as the initial phase B when it is not satisfied.

Also, the ECU 41 may execute step S52 and step S53, using the following expression (17) in place of the above-indicated expression (16).

$$|P_{n-1}-\{A\cos\{c(\theta_{n-1}-B^+)\}+P_c\}|<|P_{n-1}-\{A\cos\{c(\theta_{n-1}-B^-)\}+P_c\}| \quad (17)$$

"$A\cos\{c(\theta_{n-1}-B^-)\}+P_c$" in the left side of the above expression (17) means a provisional fuel pressure value $P_{n-1}^{-}$ calculated based on the candidate $B^-$. The right side of the expression (17) corresponds to the "predetermined value", and the predetermined value is the absolute value of the difference between the second latest fuel pressure value $P_{n-1}$ and the provisional fuel pressure value $P_{n-1}^{-}$.

When the above-indicated expression (17) is satisfied, namely, when the left side is smaller than the right side, it means that the second latest fuel pressure value $P_{n-1}$ and the provisional fuel pressure value $P_{n-1}^{+}$ are approximate to each other, and the provisional fuel pressure value $P_{n-1}^{+}$ is close to the actual fuel pressure value. Accordingly, in this case, the ECU 41 specifies the candidate $B^+$ as the initial phase B. When the expression (17) is not satisfied, it means that the difference between the second largest fuel pressure value $P_{n-1}$ and the provisional fuel pressure value $P_{n-1}^{+}$ is large, and that the second largest fuel pressure value $P_{n-1}$ and the provisional fuel pressure value $P_{n-1}^{+}$ are approximate to each other. Thus, the ECU 41 specifies the candidate $B^-$ as the initial phase B.

In the above expression (17), the inequity sign may be reversed. In this case, the candidate $B^-$ is specified as the initial phase B when the expression (17) is satisfied, and the candidate $B^+$ is specified as the initial phase B when it is not satisfied.

Also, in the expressions (16) and (17), the first latest fuel pressure value $P_n$ and the crank angle $\theta_n$ may be used, in place of the second latest fuel pressure value $P_{n-1}$ and the crank angle $\theta_{n-1}$.

Figure 12:
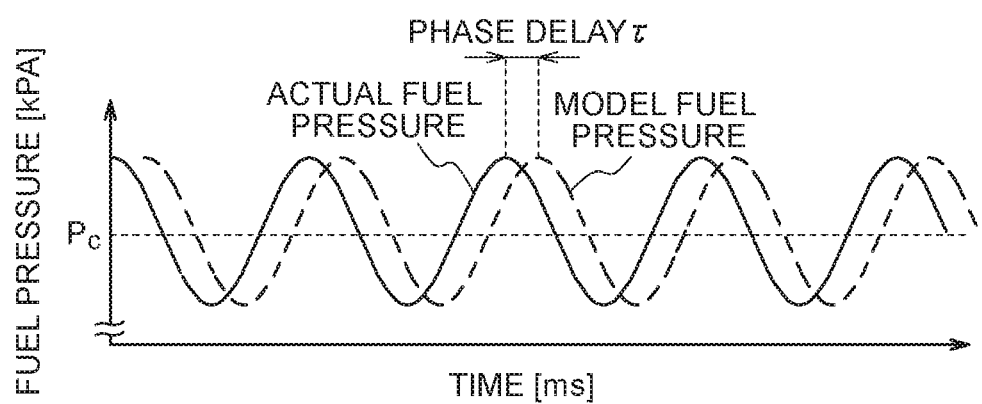
FIG. 12 is a graph indicating the case where the model fuel pressure is delayed with respect to the actual fuel pressure.

Next, prediction of the fuel pressure value P (θ) in view of time delay from the time when the fuel pressure sensor 28 generates an output signal corresponding to a detection value to the time when the ECU 41 obtains the detection value will be described. The CPU of the ECU 41 obtains a signal produced by filtering the output signal of the fuel pressure sensor 28 by means of a low-pass filter, as the detection value. The low-pass filter damps a high-frequency component of the output signal of the fuel pressure sensor 28, which component has a frequency equal to or higher than a given frequency, so as to remove a noise component included in the output signal of the fuel pressure sensor 28. The filtering may cause delay from the time when the fuel pressure sensor 28 generates the output signal corresponding to the detection value, to the time when the ECU 41 obtains the detection value. For example, as shown in FIG. 12, the model fuel pressure calculated according to the above-indicated model formula (3) may be delayed by a given phase τ with respect to the actual fuel pressure. The ECU 41 may predict the fuel pressure value P (θ), based on the following model formula (18) involving the phase τ [deg], in place of the model formula (3).

$$P(\theta)=A\cos\{c(\theta-B)\}+P_c$$

The phase delay τ is calculated in advance by experiment, and stored in the ROM of the ECU 41. The fuel pressure value P (θ) is calculated according to the model formula (18), so that the fuel pressure value can be predicted with higher accuracy.

While one embodiment of the present disclosure has been described above in detail, the present disclosure is not limited to the particular embodiment, but may be subjected to various modifications and changes, within the scope of the principle of the present disclosure described in the appended claims.

What is claimed is:

1. A control system of an internal combustion engine, comprising:
    a direct injection valve configured to directly inject a fuel into a cylinder of the internal combustion engine;
    a port injection valve configured to inject the fuel into an intake port of the internal combustion engine;
    a low-pressure pump configured to pressurize the fuel;
    a low-pressure fuel supply passage through which the fuel pressurized by the low-pressure pump is supplied to the port injection valve;
    a high-pressure pump operatively linked with the internal combustion engine and configured to be driven by the internal combustion engine, the high-pressure pump being configured to further pressurize the fuel supplied from the low-pressure fuel supply passage such that pulsation of a fuel pressure is generated in the low-pressure fuel supply passage;
    a high-pressure fuel supply passage through which the fuel pressurized by the high-pressure pump is supplied to the direct injection valve;
    a crank angle sensor configured to detect a crank angle of the internal combustion engine;
    a fuel pressure sensor configured to detect the fuel pressure in the low-pressure fuel supply passage; and
    an electronic control unit configured to:
    (i) obtain a detection value of the fuel pressure sensor at fixed sampling time intervals;
    (ii) calculate a center fuel pressure value of the pulsation of the fuel pressure, based on at least a first latest fuel pressure value and a second latest fuel pressure value as detection values of the fuel pressure sensor, the first latest fuel pressure value being obtained most recently, the second latest fuel pressure value being obtained immediately before the first latest fuel pressure value is obtained;

(iii) calculate an amplitude of the pulsation of the fuel pressure based on at least the second latest fuel pressure value and the first latest fuel pressure value;
(iv) calculate an initial phase of the pulsation of the fuel pressure, based on at least one of the second latest fuel pressure value and the first latest fuel pressure value; and
(v) predict a fuel pressure value corresponding to the crank angle, based on a formula as follows:

$$P(\theta)=A\cos\{c(\theta-B)\}+P_c$$

where P is a fuel pressure value corresponding to the crank angle, $\theta$ is the crank angle, c is a number of times of discharge of the fuel from the high-pressure pump per 360 degrees of the crank angle, $P_c$ is the center fuel pressure value, A is the amplitude, and B is the initial phase.

2. The control system of the internal combustion engine according to claim 1, wherein the electronic control unit is configured to calculate the amplitude, based on the second latest fuel pressure value and the first latest fuel pressure value and the crank angle corresponding to the sampling time interval.

3. The control system of the internal combustion engine according to claim 2, wherein the electronic control unit is configured to calculate the initial phase, based on the one of the second latest fuel pressure value and the first latest fuel pressure value, the crank angle at a time when the one of the second latest fuel pressure value and the first latest fuel pressure value is obtained, the number of times of discharge, the amplitude, and the center fuel pressure value.

4. The control system of the internal combustion engine according to claim 1, wherein the electronic control unit calculates the center fuel pressure value, based on a third latest fuel pressure value, the second latest fuel pressure value, the first latest fuel pressure value, and the crank angle corresponding to the sampling time interval, the third latest fuel pressure value being a detection value of the fuel pressure sensor obtained immediately before the second latest fuel pressure value is obtained.

5. The control system of the internal combustion engine according to claim 1, wherein the electronic control unit is configured to calculate a smoothed value obtained through a smoothing operation based on the second latest fuel pressure value and the first latest fuel pressure value, as the center fuel pressure value.

6. The control system of the internal combustion engine according to claim 5, wherein the electronic control unit is configured to set a smoothing coefficient for use in the smoothing operation to a smaller value as a difference between a target value of the fuel pressure in the low-pressure fuel supply passage and the calculated center fuel pressure value is larger, as compared with a case where the difference is smaller.

7. The control system of the internal combustion engine according to claim 1, wherein:
the electronic control unit is configured to calculate an average value of a plurality of the detection values including the second latest fuel pressure value and the first latest fuel pressure value, as the center fuel pressure value; and
the electronic control unit is configured to calculate an average value of a smaller number of the detection values as the center fuel pressure value as a rotational speed of the internal combustion engine is higher, as compared with a case where the rotational speed is lower.

8. The control system of the internal combustion engine according to claim 1, wherein the electronic control unit is configured to predict the fuel pressure value corresponding to the crank angle, based on a formula below, in view of a phase delay from a time when the fuel pressure sensor generates an output signal corresponding to the detection value to a time when the electronic control unit obtains the detection value:

$$P(\theta)=A\cos\{c(\theta-B-\tau)\}+P_c$$

where $\tau$ is the phase delay.

9. The control system of the internal combustion engine according to claim 1, wherein:
the electronic control unit is configured to determine whether a rotational speed of the internal combustion engine calculated based on an output of the crank angle sensor belongs to a pulsation increase region in which the pulsation is larger than that in the other rotational speed region of the internal combustion engine; and
the electronic control unit is configured to predict the fuel pressure value, when the electronic control unit determines that the rotational speed of the internal combustion engine belongs to the pulsation increase region.

10. The control system of the internal combustion engine according to claim 1, wherein:
the electronic control unit is configured to control a fuel injection amount of the port injection valve, based on the predicted fuel pressure value;
the electronic control unit is configured to determine whether a start time of fuel injection of the port injection valve is after the first latest fuel pressure value is obtained, and before a next detection value of the fuel pressure is obtained; and
the electronic control unit is configured to predict the fuel pressure value, when the start time of fuel injection of the port injection valve is after the first latest fuel pressure value is obtained, and before the next detection value of the fuel pressure is obtained.

* * * * *